E. R. GOULD.
DOLL.
APPLICATION FILED APR. 12, 1916.

1,346,953.

Patented July 20, 1920.
5 SHEETS—SHEET 1.

Witnesses

Inventor
Edward R. Gould
By
Attorney

E. R. GOULD.
DOLL.
APPLICATION FILED APR. 12, 1916.
1,346,953.
Patented July 20, 1920.
5 SHEETS—SHEET 2.
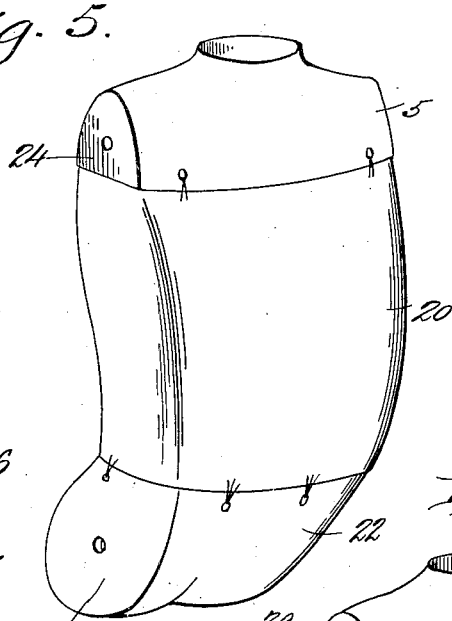
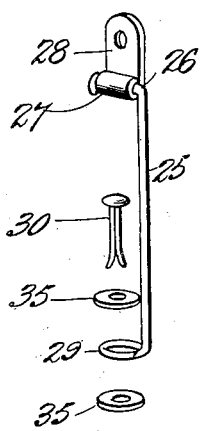
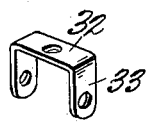
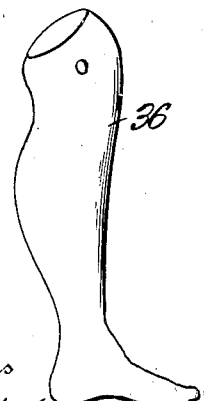
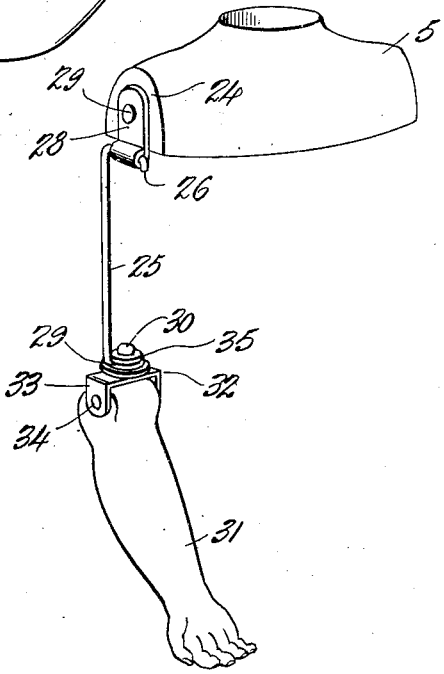
Inventor
Edward R. Gould
Witnesses
By N. H. Byrne
Attorney E. R. GOULD.
DOLL.
APPLICATION FILED APR. 12, 1916.
1,346,953.
Patented July 20, 1920.
5 SHEETS—SHEET 3.
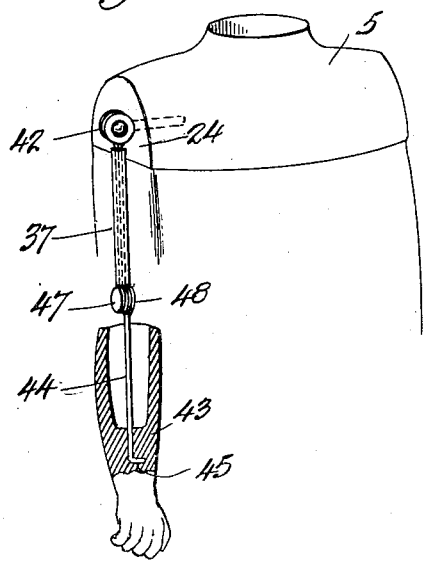
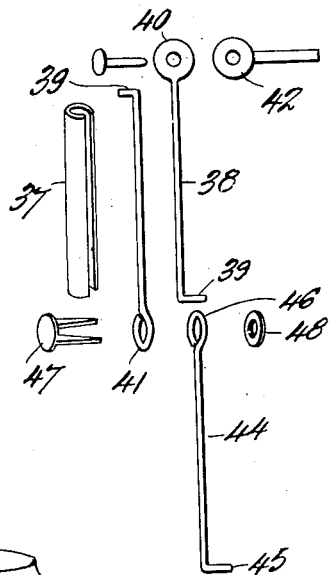
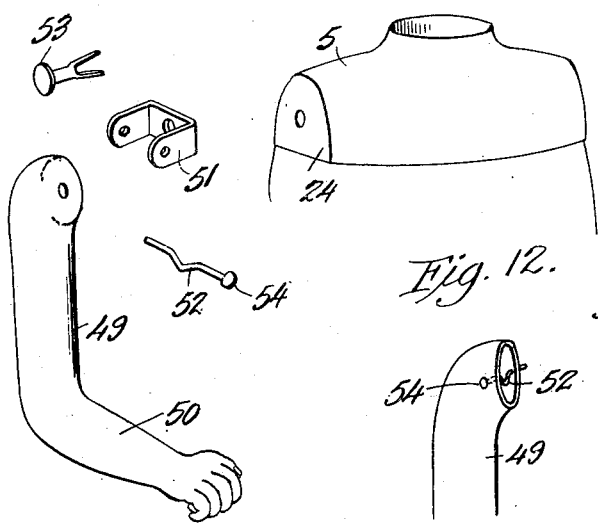
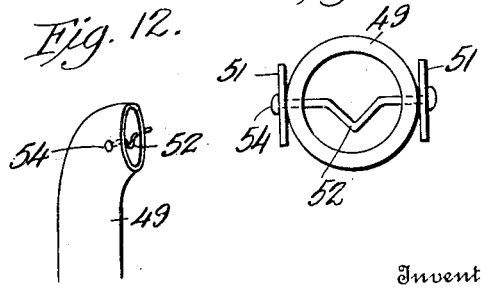
Witnesses
Chas H Trott
E. S. Clement
Inventor
Edward R. Gould
By
H. H. Byrne
Attorney

E. R. GOULD.
DOLL.
APPLICATION FILED APR. 12, 1916.

1,346,953.

Patented July 20, 1920.
5 SHEETS—SHEET 4.

Witnesses
Chas. H. Scott
E. J. Clements

Inventor
Edward R. Gould

By H. H. Byrne
Attorney

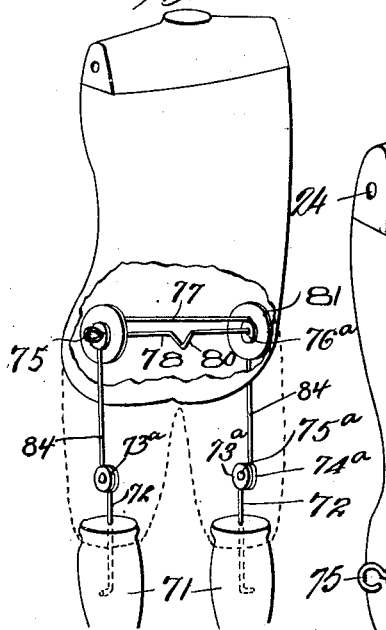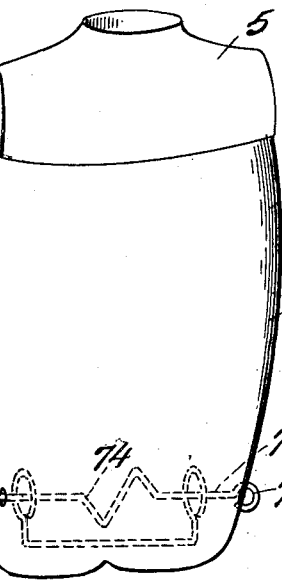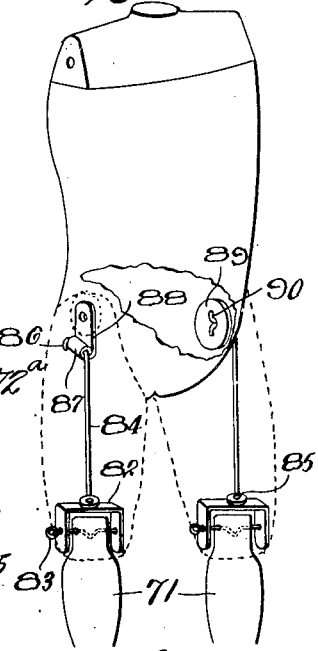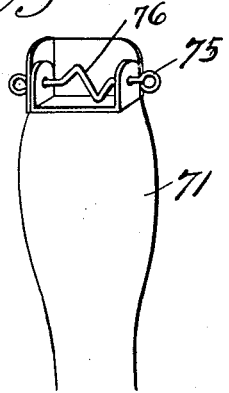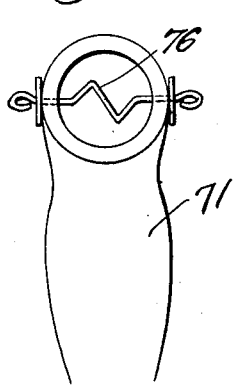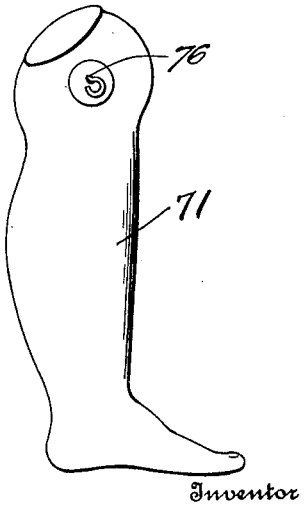

UNITED STATES PATENT OFFICE.

EDWARD R. GOULD, OF NEW YORK, N. Y.

DOLL.

1,346,953.  Specification of Letters Patent.  Patented July 20, 1920.

Application filed April 12, 1916. Serial No. 90,732.

*To all whom it may concern:*

Be it known that I, EDWARD R. GOULD, a citizen of the United States, residing at 1039 Faile street, Bronx, Bronx county, New York city, N. Y., have invented certain new and useful Improvements in Dolls; and I do hereby declare the following to be a full, clear, and exact description of the invention, such as will enable others skilled in the art to which it appertains to make and use the same.

The present invention relates to dolls and consists in the combinations and arrangements of parts hereinafter described and particularly set forth in the accompanying claims.

The invention has for its purpose to construct a doll which will have a range of action more human like and of greater variety than those now offered by domestic or foreign manufacturers, and which may be produced at no greater cost than that now involved in making dolls.

With the dolls now offered to the people, there is a decided fault in that such dolls lack the action of the human body as such action is limited to only one movement at the shoulder and hip, and all, with but limited exceptions, have no action at the elbow or knee. The exceptions referred to are such as are copied after imported dolls made with ball and socket joints. This latter type of construction is not well adapted to American factory methods or economy of production. To attain this end a different and entirely novel construction is proposed, to wit: by securing the desired action through the use of friction joints. The method proposed is disclosed in the accompanying drawings, wherein:

Figure 1:
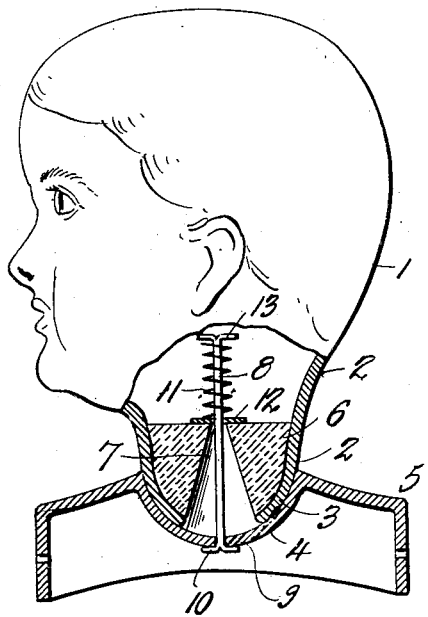
Figure 1 is an elevational view of a doll's head, the lower part of the head and the yoke member to which it is attached being in central sectional view showing the connection between the head and body of the doll.
Figure 2:
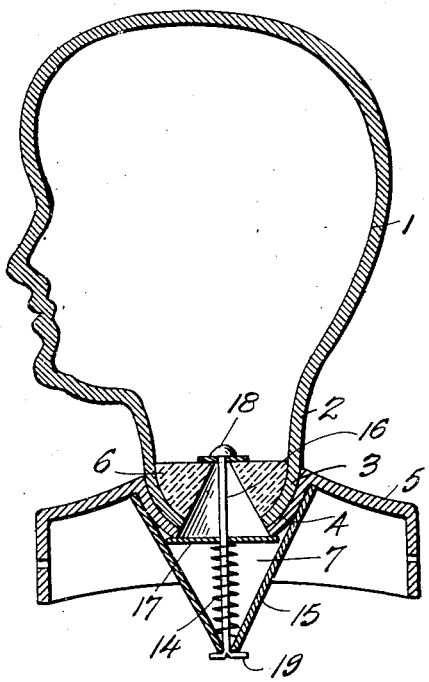
Fig. 2 is a central sectional view showing a modified construction of the form of connection illustrated in Fig. 1.
Figure 3:
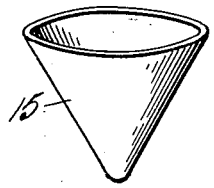
Figure 4:
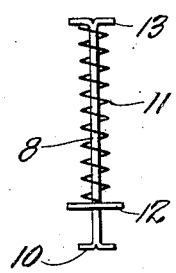

Fig. 3 a detailed perspective view of the cone employed in the form shown in Fig. 2, Fig. 4 a detailed perspective view of the spring tensioned connecting rod shown in Fig. 1, Fig. 5 a perspective view of the torso construction, Fig. 6 is a perspective view showing the arm construction and yoke piece and the device for connecting those parts.

Fig. 7 is a perspective view of the leg and connecting parts dis-assembled.

Fig. 8 is a perspective view of the yoke piece and a modified construction of arm and securing members, the arm being shown partly in central section.

Fig. 9 is a perspective view illustrating the parts of the arm in Fig. 8 disassembled.

Fig. 10 is a similar view of another form of arm construction, with the parts disassembled.

Fig. 11 is a sectional view on a line through the middle of the wing pieces of member 51 looking into the socket end of the arm when the parts shown in Fig. 10 are assembled, this view showing in detail the manner of attaching the arm.

Fig. 12 is a perspective view of the socket end of the arm with the fastening wire shown in position to fasten the arm to member 51 (not shown).

Figure 13:
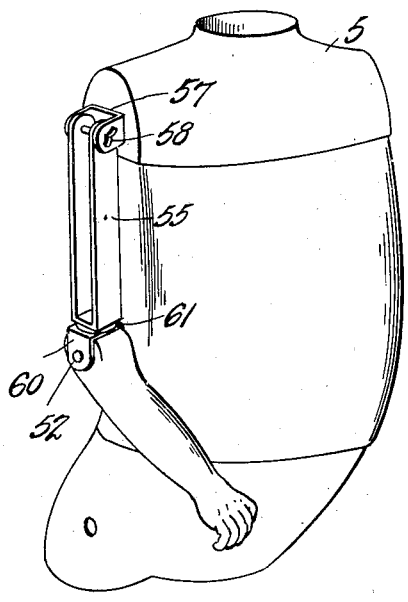

Fig. 13 is a perspective view of the torso and an arm of modified construction connected thereto.

Figure 14:
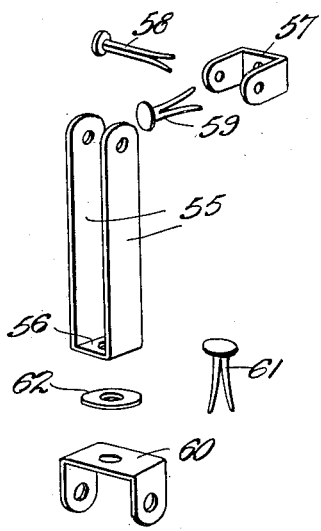

Fig. 14 is a perspective view showing the parts of the arm in Fig. 13 disassembled.

Figure 15:
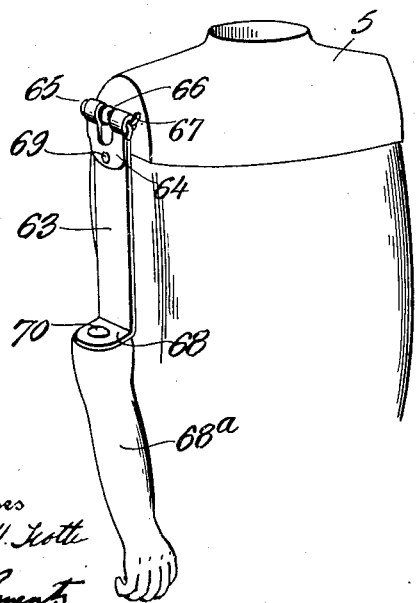

Fig. 15 is a perspective view of the torso showing a further modified form of arm connected thereto.

Figure 16:
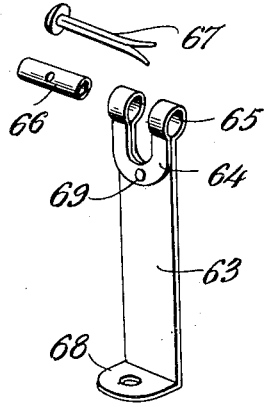

Fig. 16 is a perspective view of the parts of the arm shown in Fig. 15, with the parts disassembled.

Fig. 17 is a perspective view of the torso, with the leg-connecting devices shown, partly in dotted lines, in position thereon.

Fig. 18 is a perspective view of a leg member showing the leg connection.

Fig. 19 is a perspective view of a part of the leg-connecting device in position on the leg member.

Fig. 20 is a sectional view through the leg-fastening device looking into the socket end of the leg, illustrating the manner in which the leg-connecting members are fitted to the leg parts.

Figs. 21 and 22 are perspective views, with parts broken away, of the torso and leg members, each view showing a modified form of connecting device for the leg members.

Referring to the construction in further detail and wherein like reference characters designate corresponding parts in the different views shown, 1 represents the head of the doll, designed after the usual form, and 2 the neck thereof which is shaped with a ball or rounded end 3 to enter the complementary formed socket 4 in the yoke piece 5. The neck portion 2 has a cement or other suitable filling 6 that is formed with a central opening or aperture 7 of substantially frusto-conical design, as clearly shown in Figs. 1 and 2. A rod 8, of wire or like material, passes through the opening 7 and an aperture 9 in the base of the yoke socket 4, and on its inner end said rod is suitably upset or otherwise distorted, as at 10, to engage with the underside of the yoke socket in the manner shown.

A spiral spring 11 is fitted on the rod 8 within the head and, at its respective ends, engages with the washer 12 seated on the top of the cement filling 6, and the projection or other enlargement 13 formed on the end of said rod. (See Fig. 1).

In the arrangement shown in Fig. 2 the construction is generally similar to that of Fig. 1, excepting that the spring 14 is below or within the yoke piece. A conical member 15, of hollow construction, receives the connecting rod or wire 16 and seats with the rim of its base against the socket part of the yoke, and the washer 17 rests against said socket portion and forms a base for the spring 14. The respective ends 18 and 19 of the wire are upset or otherwise headed and bear against the filler 6 and apex of the hollow cone 15.

It will be seen from the foregoing that the doll's head can be readily connected or attached to the yoke piece of the torso, and that the head may be readily positioned at any inclination desired. Also that the spring tensioned connecting rod will hold the parts under sufficient frictional contact to maintain the head in the position at which it is set.

The torso shown in Fig. 5 consists of a stuffed body 20, having suitably secured thereon a shoulder or yoke piece 5 that is constructed of suitable composition or metal, and a like hip piece 22 is attached at the lower portion. The yoke 5 is formed with flattened shoulder portions 24, against which bear the flat surfaces of the arm securing devices to be hereinafter described. The hip member 22 also has flattened portions 24 for the leg securing means further described herein.

The arm consists of a wire 25, bent as at 26, to engage the tubular end 27 of the metal plate 28 that is apertured to receive the screw for connecting the arm to the shoulder of the yoke piece 5. Said screw enters the yoke piece at the flattened face 24 and thereby allows the arm freedom of swinging within the plane of said face. The lower end of the wire 25 is formed with a loop 29 to receive the rivet 30 that connects the wire 25 with the arm member 31. This connection consists of a yoke piece 32 whose side members 33 receive the wire fastener 34. A pair of washers 35 are fitted on the rivet 30 to either side of the loop portion 29, and therewith form the pivotal connection for the fore-arm or wrist part 31. This latter connection permits the wrist to be turned in any angular direction about the rivet and, together with the arm member 25, gives universal motion to the arm as a whole.

The parts illustrated in Fig. 7 are the same as those in Fig. 6, except that in Fig. 7, the leg 36 is substituted for the arm member 31. In this arrangement, however, (i. e. Fig. 7) the manner of working the leg is the same as that of the arm as just stated.

The arm shown in Fig. 8 comprises a tubular part 37 receiving the pair of wires 38 whose respective ends are bent as at 39, and formed with flattened apertured portions 40 and 41 (see Fig. 9). The part 40 fits with friction against the member 42 in the yoke 5 and is held thereat by a screw or other securing means. With these parts thus connected the arm may freely move at any angle within the plane of the surface 24 and will stay in set position through the friction of the parts. The sleeve or tube 37 is split lengthwise for convenience in assembling or dis-assembling the parts.

The upper arm portion is connected to the lower fore-arm or wrist portion 43 by the wire 44 whose lower end 45 is bent to engage within the composition from which said arm is made. The upper end of the arm wire 44 is formed with a flattened and apertured portion 46 to receive the connecting rivet 47, and said rivet is fitted with a washer 48. These connecting parts are so arranged and adjusted that the lower arm member 43 may be moved at any angle relatively to the upper arm portion, at right angles to the plane of movement of said upper arm portion. Thereby the arm as a whole may be moved universally and at will.

The wire 44 may, in like manner, be connected to the leg below the knee when the leg may be then manipulated as desired. In either case (i. e. for arm or leg) the elements thereof possess sufficient friction to hold themselves in any position. Thus the assembly of the wires 38 within the tube 37 is such that the twisting effect of the arm may be produced. In the form shown in Fig. 6, the twisting of the arm or leg is provided for by the pivotal connection 30. Also in this construction, the hooked end 26 of the rod 25 and the pivotal member 34 give the necessary turning or swinging movement.

The arm 49 in Fig. 10 has the lower arm or fore-arm 50 formed therewith by a rigid elbow connection, i. e. there is no relative movement between the upper arm and the fore-arm. A plate 51 is fastened to arm 49 at the shoulder by the crimped or bent wire strand 52 and the arm is adapted to swing on said strand. A pivot pin 53 connects the member 51 to the face 24 of the yoke piece 5 and the arm as a whole swings on said pin 53 at all angles within the plane thereof. The strand 52 is crimped intermediate its ends to draw together the headed ends thereof and thereby fasten the member 51 to the shoulder of the arm, thereby producing any desired degree of friction between 51 and arm 49, to hold same at any angle.

In Figs. 13 and 14, the upper arm part is formed from a strip 55 doubled upon itself at 56, and secured to the swivel plate 57 that has a pair of lugs to receive the pin 58. A pin 59 fastens the member 57 to the shoulder part of the yoke 5, and the arm may be moved universally on the pair of pins 58 and 59, inasmuch as said pins are disposed at relatively right angles. The fore-arm is connected to the member 55 by the part 60 on the swivel pin 61, and a washer 62 is interposed between the parts 56 and 60 on said pin 61. A fastening wire 52 secures the fore-arm proper to the member 60, after the manner shown in Figs. 11 and 12. With these parts the arm has freedom of universal movement, and there is enough friction between the different members to hold the arm at any desired position.

With the arrangement disclosed in Figs. 15 and 16, a single strip 63 is connected to U-shaped piece 64, that is formed with a pair of loops or eye members 65, and this part is swivelly mounted on the tubular member or sleeve 66. Said sleeve is mounted on the yoke piece 5 by the pin 67 that passes through said sleeve, as shown in Fig. 15. These parts give the arm as a whole universal motion from the shoulder. An angular portion 68 on the lower end of said member 63 is connected directly to the fore-arm 68ᵃ by the swivel pin 70.

The leg parts 71 are connected to the torso 72ᵃ by means of the strand or rod 73 that is crimped as at 74 whereby to draw together the looped ends 75 that have attached thereto the two legs at the thighs. The two parts of each leg are connected at the knee by the crimped strand 76, and at the thigh the legs are fastened to the torso by the hooks or loops 75. When the wire 74 is crimped, the ends thereof are drawn together bringing the legs closely into contact with the torso and with the necessary friction between the several parts to maintain the legs at the positions to which set.

In the construction shown in Fig. 21, the legs 71, formed of suitable composition, are secured to the wires 72 having hooked end portions embedded therein, and on their opposite ends, are formed with disks 73ᵃ swiveled on similar disks 74ᵃ, by the pins 75ᵃ, and said disks 74ᵃ are formed on the ends of the wires or strands 84 forming the upper leg portions. The upper ends of the wires 84 are swiveled on the projecting ends of the strand 74, whose end portions are looped, as at 75, to hold said wires 84 against displacement. A spacing strand 77, carrying disks 76ᵃ, bears against the inner surfaces of the free disks 81, after the manner shown. Thus, the leg portions or wires 84 have their disk ends clamped between the looped ends 76 and the larger disks 81, giving freedom of leg movement for the doll at the hips, and the pivotal portions 73ᵃ and 74ᵃ provide for the necessary movement at the knees.

In Fig. 22, the leg portions 71 are secured to the bent plates or clips 82 by the strands 83, and said plates are, in turn, swiveled on the lower ends of the rods 84 that are formed with disks 85 at said ends to receive the pivot pins. The upper ends of the rods 84 are bent, as at 86, to engage the bearing member 87 of the swiveled plates 88. Said plates 88 are secured to the torso by pins 90 passing therethrough and engaging with disks 89 located on the inner side of the torso covering.

While I have disclosed certain ways of carrying the foregoing described objects into effect, it will be understood that I am not limited to the precise details shown. I therefore reserve the right to make such changes in the construction and general details of the article as will better adapt the same to the purpose in view, and am not limited in such variation except as defined by the claims.

Having thus described my invention, what I claim as new and desire to protect by United States Letters Patent, is:

1. A device for connecting parts of dolls comprising a member having side portions carried by one of the doll parts and adapted to embrace the other doll part, and a strand passing through the second named part and said side portions, said strand having headed end portions engaging said side portions, and the intermediate portion of the strand being crimped to draw said side portions into frictional engagement with their respective contacting parts, substantially as described.

2. A limb for dolls comprising a plate having parallel projecting portions, a member pivotally mounted between said projecting portions, a wire having swivel connection with said plate and constructed with a bent portion, and a plate having swivel connection with said bent wire portion and adapted to be swivelly mounted on the torso of the doll, substantially as described.

3. A limb for dolls comprising a strand or strip portion forming one length of the limb, joints connected to said metal portion adapted to give universal movement to the limb, and a composition portion forming the remaining part of the limb, substantially as set forth.

4. A limb for dolls comprising a strand or strip portion forming one length of the limb, pivotal members at either end thereof for connecting the limb to the torso and providing a medial joint for the limb, and a composition portion forming the remaining part of the limb, substantially as set forth.

In testimony whereof I have affixed my signature, in presence of two witnesses.

EDWARD R. GOULD.

Witnesses:
CHAS. H. TROTTER,
E. G. CLEMENTS.